(12) United States Patent
Kagawa et al.

(10) Patent No.: US 10,538,026 B2
(45) Date of Patent: Jan. 21, 2020

(54) APPARATUS FOR PRODUCING MICROPOROUS PLASTIC FILM

(71) Applicants: Seiji Kagawa, Koshigaya-shi, Saitama (JP); Atsuko Kagawa, Koshigaya-shi, Saitama (JP)

(72) Inventors: Seiji Kagawa, Koshigaya (JP); Yoichiro Kagawa, Koshigaya (JP)

(73) Assignees: Seiji Kagawa, Koshigaya-Shi (JP); Atsuko Kagawa, Koshigaya-Shi (JP)

( * ) Notice: Subject to any disclaimer, the term of this patent is extended or adjusted under 35 U.S.C. 154(b) by 205 days.

(21) Appl. No.: 15/636,163

(22) Filed: Jun. 28, 2017

(65) Prior Publication Data

US 2018/0178442 A1    Jun. 28, 2018

(30) Foreign Application Priority Data

Dec. 22, 2016  (JP) ................................. 2016-249734

(51) Int. Cl.
*B29C 59/04*   (2006.01)
*B29C 59/00*   (2006.01)
B29K 105/04   (2006.01)
B29L 7/00     (2006.01)

(52) U.S. Cl.
CPC ............ *B29C 59/04* (2013.01); *B29C 59/002* (2013.01); *B29K 2105/041* (2013.01); *B29L 2007/00* (2013.01)

(58) Field of Classification Search
None
See application file for complete search history.

(56) References Cited

U.S. PATENT DOCUMENTS

| 3,273,199 | A | * | 9/1966 | Kleinewefers ....... B01D 35/005 |
| | | | | 100/158 C |
| 5,352,108 | A | | 10/1994 | Kagawa et al. |
| 5,451,257 | A | | 9/1995 | Kagawa et al. |
| 5,648,107 | A | * | 7/1997 | Kagawa .................... B26F 1/24 |
| | | | | 264/284 |
| 6,210,145 | B1 | * | 4/2001 | Seide ...................... B29C 43/22 |
| | | | | 425/194 |
| 6,418,827 | B1 | | 7/2002 | Bussey, III et al. |

FOREIGN PATENT DOCUMENTS

| JP | 6-71598 A | 3/1994 |
| JP | 6-328483 A | 11/1994 |
| JP | 11-77594 A | 3/1999 |
| WO | WO 97/23398 A1 | 7/1997 |

* cited by examiner

*Primary Examiner* — Xiao S Zhao
*Assistant Examiner* — Asha A Thomas
(74) *Attorney, Agent, or Firm* — Birch, Stewart, Kolasch & Birch, LLP

(57) ABSTRACT

An apparatus for producing a macroporous plastic film comprising a first roll rotatably supported by stationary frames; a second roll movable up and down along movable frames; a first driving means for rotating the movable frames; and second driving means mounted to the movable frames for moving the second roll up and down; one of the first and second rolls being a pattern roll having large numbers of high-hardness, fine particles on its rolling surface, and the other being an anvil roll; large numbers of fine pores being formed in the plastic film by the high-hardness, fine particles, in a state where the center axis of the second roll is inclined to the center axis of the first roll in a horizontal plane by the operation of the first driving means.

11 Claims, 16 Drawing Sheets

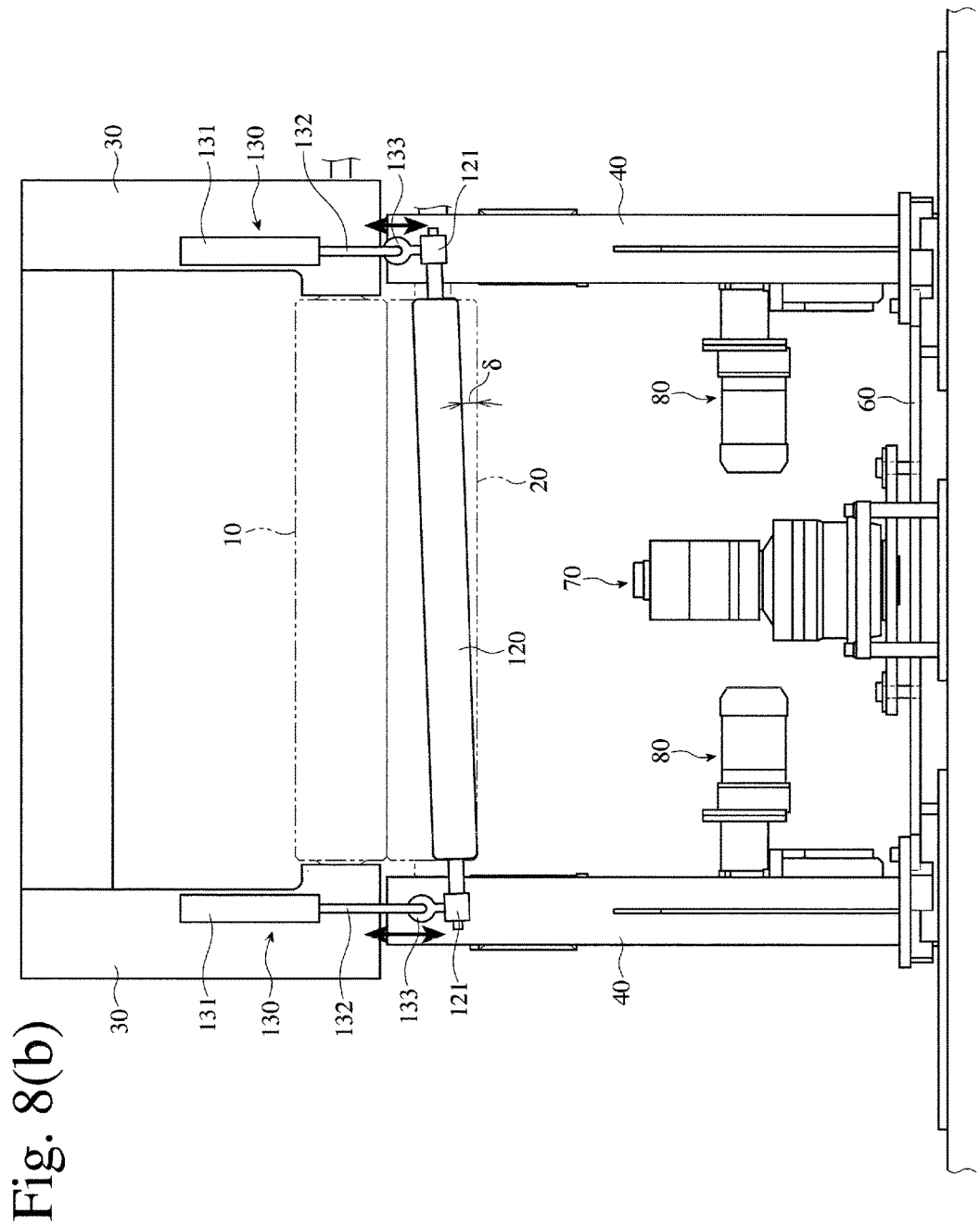

APPARATUS FOR PRODUCING MICROPOROUS PLASTIC FILM

FIELD OF THE INVENTION

The present invention relates to an apparatus for precisely producing a microporous plastic film having high air permeability and moisture permeability while preventing the bending of a pattern roll and an anvil roll.

BACKGROUND OF THE INVENTION

Breads, cookies, vegetables, fermented foods such as fermented soybeans and kimchi, etc. have been conventionally sold in a state wrapped in paper or plastic bags. Though paper bags have high air permeability and moisture permeability, they are disadvantageous in not permitting their contents to be seen. On the other hand, plastic bags permit contents to be seen, but they are disadvantageous in not having sufficient air permeability and moisture permeability, and extremely deteriorating the flavor and texture of foods.

To obtain a plastic film permitting contents to be well seen, while having high air permeability and moisture permeability, apparatuses for forming large numbers of fine pores in a plastic film are known. For example, JP 6-71598 A discloses an apparatus for producing a microporous film comprising a means for supplying a long plastic film, a first roll (pattern roll) having large numbers of high-hardness, fine particles having sharp edges and Mohs hardness of 5 or more fixed to its rolling surface, a second roll (metal roll) having a flat rolling surface and rotatable in an opposite direction to that of the first roll, a pressure-adjusting means disposed near both ends of either one roll for adjusting a pushing force to the long plastic film, and a means for applying high voltage to the first roll, either one or both of the first and second rolls being movable in their arrangement direction. The first and second rolls are arranged in parallel, and the long plastic film passing through a gap therebetween is provided with large numbers of fine pores by large numbers of high-hardness, fine particles on the first roll.

However, when large numbers of fine pores are formed in a plastic film (not shown) as thick as about 8-100 µm passing through a gap between a pattern roll 10 and an anvil roll (metal roll) 20, a large load is applied to the pattern roll 10 and the anvil roll 20, so that both rolls 10, 20 tend to be bent, resulting in a gap G, which is wider in a transverse center portion than in both side edge portions, as shown in FIG. 16. Fine pores formed by an uneven gap G have different opening diameters and depths between a transverse center portion and both side edge portions of the film, failing to obtain a microporous plastic film Fa having transversely uniform air permeability.

To prevent the bending of a pattern roll 10 and a anvil roll 20, backup rolls were arranged above the pattern roll 10 and/or under the anvil roll 20. However, because of large numbers of high-hardness, fine particles attached to a rolling surface of the pattern roll 10, soft-surface rubber rolls, etc. should be used as backup rolls, failing to sufficiently prevent the bending of the pattern roll 10 and the anvil roll 20.

JP 6-328483 A discloses an apparatus for calendaring a film of a thermoplastic polymer or rubber by six rolls arranged in substantially parallel, a sixth roll being arranged just under first to fifth rolls; and comprising a crossing means for inclining the fifth roll by a small angle. However, the angle of the fifth roll inclined by the crossing means is constant, and the calendaring apparatus does not have a driving means for obtaining a desired inclination angle. Accordingly, even if this calendaring apparatus were used to form fine pores in a plastic film, fine pores having various sizes and distributions cannot be formed uniformly in a width direction.

OBJECT OF THE INVENTION

Accordingly, an object of the present invention is to provide an apparatus capable of forming large numbers of transversely uniform fine pores in a plastic film precisely and efficiently, while preventing the bending of a pattern roll and a metal roll.

SUMMARY OF THE INVENTION

As a result of intensive research in view of the above object, the inventor has found that when the center axes of a pattern roll 10 and an anvil roll 20 both slightly bent by stress are inclined to each other by a small angle θ as shown in FIGS. 1(a) and 1(b), the pattern roll 10 and the anvil roll 20 are in linear contact with each other under uniform pressure, so that large numbers of fine pores can be aimed in a wide plastic film F uniformly in a width direction. The present invention has been completed based on such findings.

Thus, the apparatus of the present invention for producing a microporous plastic film comprises, a first roll rotatably supported by a pair of laterally arranged stationary frames;

a second roll movable up and down along a pair of laterally arranged movable frames, such that the second roll is brought into contact with the first roll via a plastic film;

a conveying means for passing the plastic film through a gap between the first roll and the second roll;

a first driving means for rotating a pair of the movable frames;

second driving means each mounted to each of the movable frames for moving up and down the second roll;

a third driving means for rotating the first roll; and a fourth driving means for rotating the second roll;

one of the first and second rolls being a pattern roll randomly having large numbers (pluralities) of high-hardness, fine particles on its rolling surface, and the other being an anvil roll; and in a state where the center axis of the second roll is inclined to the center axis of the first roll in a horizontal plane by the operation of the first driving means, the plastic film passing through a gap between the first roll and the second roll, so that the high-hardness, fine particles form large numbers (pluralities) of fine pores in the plastic film.

A pair of the movable frames are preferably rotated by the first driving means along a pair of laterally arranged horizontal circularly curved guide rails.

The movable plates, to which the movable frames are fixed, are preferably fixed to both ends of a horizontal plate connected to the first driving means.

Each of the circularly curved guide rails preferably engages a guide groove on a bottom surface of each of the movable plates.

It is preferable that a strain-removing roll coming into contact with a plastic film provided with large numbers of fine pores (perforated plastic film), and a pair of fifth driving means for changing the heights of bearings rotatably supporting both ends of the strain-removing roll are arranged downstream of a gap between the first roll and the second roll; and at least one end of the strain-removing rolls is moved up or down by operating at least one of the fifth driving means, thereby vertically inclining the strain-removing roll to the perforated plastic film, to absorb strain generated in the perforated plastic film due to the inclination of the center axis of the second roll to the center axis of the first roll.

The apparatus of the present invention for producing a microporous plastic film preferably further comprises, downstream of a gap between the first roll and the second roll, a sensor for observing the characteristics of the resultant perforated plastic film; and a means (controller) receiving an output signal of the sensor for forming a signal for adjusting a gap between the first roll and the second roll, a signal for adjusting the horizontal inclination angle of the center axis of the second roll to the center axis of the first roll, and a signal for adjusting the vertical inclination angle of the strain-removing roll, to obtain a desired perforated plastic film.

It is preferable that the perforation of the plastic film is started, in a state where the horizontal inclination angle of the center axis of the second roll to the center axis of the first roll is 0°, and where the vertical inclination angle of the strain-removing roll is 0°; and that the first and second driving means and the fifth driving means are then operated according to the output signal of the sensor.

It is preferable that the first roll is a pattern roll, while the second roll is an anvil roll.

The high-hardness, fine particles of the pattern roll preferably have sharp edges and Mohs hardness of 5 or more.

The anvil roll is preferably a metal roll having a flat rolling surface, or a metal roll randomly having large numbers (pluralities) of recesses having an opening diameter distribution and a depth distribution adapted to the high-hardness, fine particles of the pattern roll.

The area ratio of the high-hardness, fine particles on a rolling surface of the pattern roll is preferably 10-70%.

When the anvil roll is a metal roll randomly having large numbers of recesses having an opening diameter distribution and a depth distribution adapted to the high-hardness, fine particles of the pattern roll, the area ratio of the recesses on a rolling surface of the anvil roll is preferably 10-70%.

BRIEF DESCRIPTION OF THE DRAWINGS

FIG. 8(b) is a rear view showing a strain-removing roll mounted to the apparatus of the present invention, which is in a vertically inclined state.

DESCRIPTION OF THE PREFERRED EMBODIMENTS

The embodiments of the present invention will be explained in detail below referring to the attached drawings. Explanations of each embodiment are applicable to other embodiments unless otherwise mentioned. Explanations below are not restrictive, but various modifications may be made within the scope of the present invention.

[1] First Embodiment

Figure 1A:
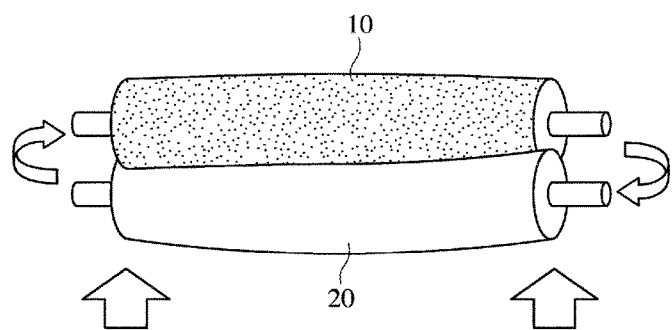
FIG. 1(a) is a perspective view showing a pattern roll and an anvil roll relatively inclined to each other.
Figure 1B:
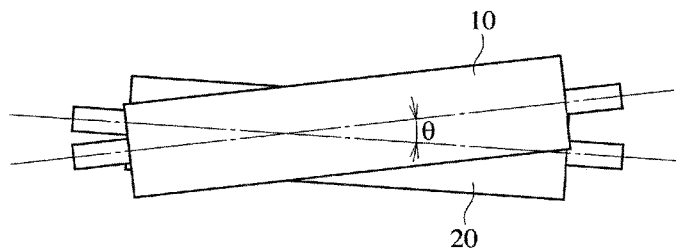
FIG. 1(b) is a plan view showing a pattern roll and an anvil roll relatively inclined to each other.
Figure 2:
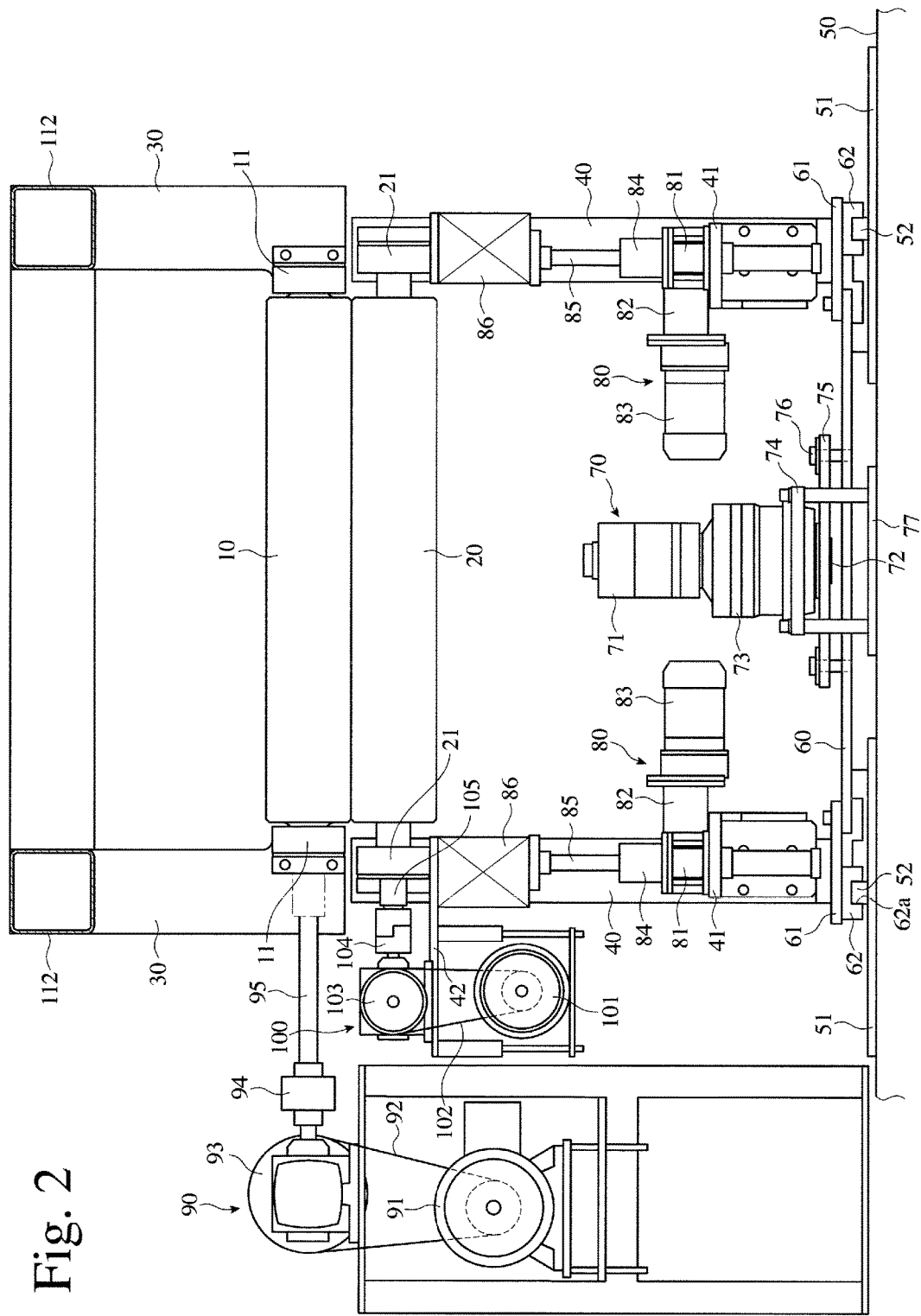
FIG. 2 is a front view showing a main portion of an apparatus for producing a microporous plastic film according to the first embodiment of the present invention.
Figure 3:
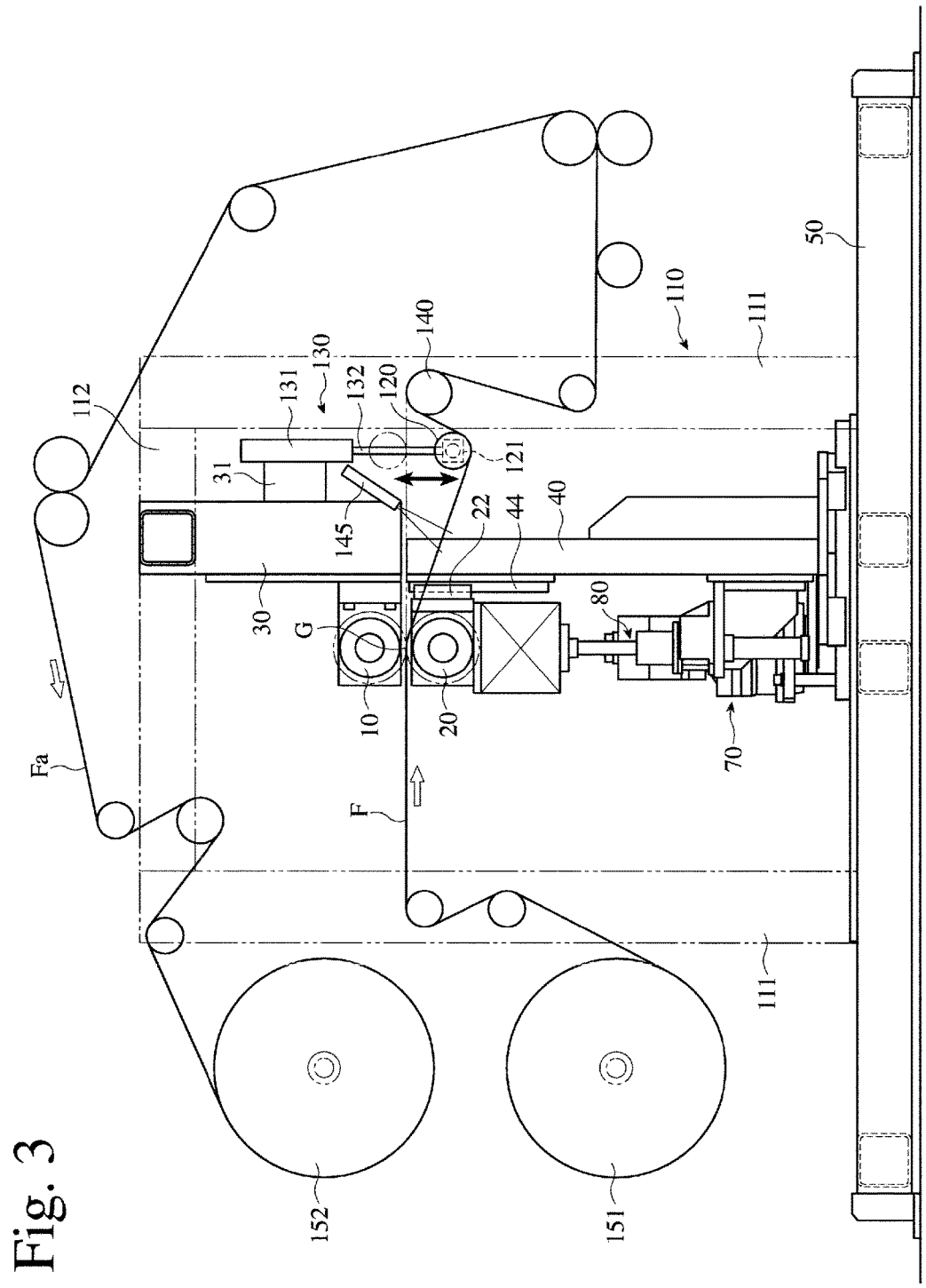
FIG. 3 is a right side view showing an apparatus for producing a microporous plastic film according to the first embodiment of the present invention.

As shown in FIGS. 2 and 3, the apparatus for producing a microporous plastic film according to the first embodiment of the present invention comprises a first roll 10 and a second roll 20 opposing each other to form fine pores in a plastic film F; a pair of laterally arranged stationary frames 30, 30 supporting a pair of bearings 11, 11 of the first roll 10; a pair of laterally arranged movable frames 40, 40 supporting a pair of bearings 21, 21 of the second roll 20; movable plates 61, 61, to each of which each movable frame 40, 40 is fixed; a horizontal plate 60 fixed to the movable plates 61, 61; a first driving means 70 fixed to an upper surface of a base 50 for rotating the horizontal plate 60; second driving means 80, 80 each moving each bearing 21, 21 of the second roll 20 up and down along each movable frame 40, 40; a third driving means 90 for rotating the first roll 10; a fourth driving means 100 for rotating the second roll 20; a first reel 151 around which a plastic film F is wound; a second reel 152 winding a resultant microporous plastic film Fa; and pluralities of guide rolls and nip rolls for guiding the plastic film F and the microporous plastic film Fa. A strain-removing roll 120 coming into contact with a plastic film provided with large numbers (pluralities) of fine pores (perforated plastic film) Fa, and a pair of fifth driving means 130, 130 for changing the heights of bearings 121, 121 rotatably supporting both ends of the strain-removing roll 120 are preferably disposed downstream of a gap G between the first roll 10 and the second roll 20.

One of the first and second rolls 10, 20 is a pattern roll, and the other is an anvil roll. Embodiments below will be explained with a pattern roll as the first roll 10 and an anvil roll as the second roll 20, though not restrictive. The first roll 10 may be an anvil roll, and the second roll 20 may be a pattern roll.

(1) Stationary Members

Figure 4:
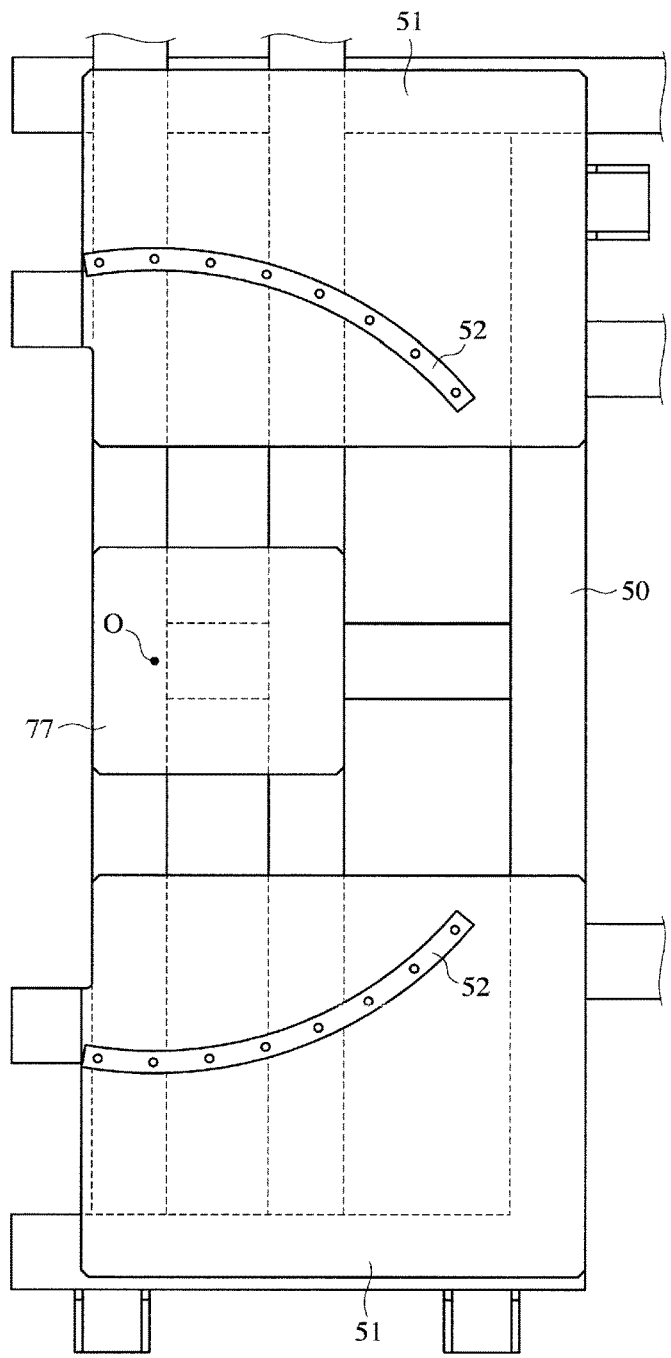
FIG. 4 is a plan view showing circularly curved guide rails fixed to a base.

As shown in FIGS. 2 and 3, a frame structure 110 comprising vertical frames 111, 111, and a pair of laterally arranged horizontal frames 112, 112 fixed to upper ends of the vertical frames 111, 111 is fixed to a base 50, and each of stationary frames 30, 30 depends from each of the horizontal frames 112, 112. As shown in FIG. 2, each bearing 11 of the pattern roll 10 is rotatably supported by each stationary frame 30, so that the pattern roll 10 is rotated at a predetermined position without moving up and down relative to the stationary frame 30. As shown in FIG. 4, a pair of laterally arranged flat plates 51, 51 are fixed to an upper surface of the base 50, and each circularly curved guide rail 52 is fixed by bolts to an upper surface of each flat plate 51. A frame 74 supporting the first driving means 70 is fixed to a flat plate 77 in a center portion of the base 50.

(2) Movable Members

Figure 5:
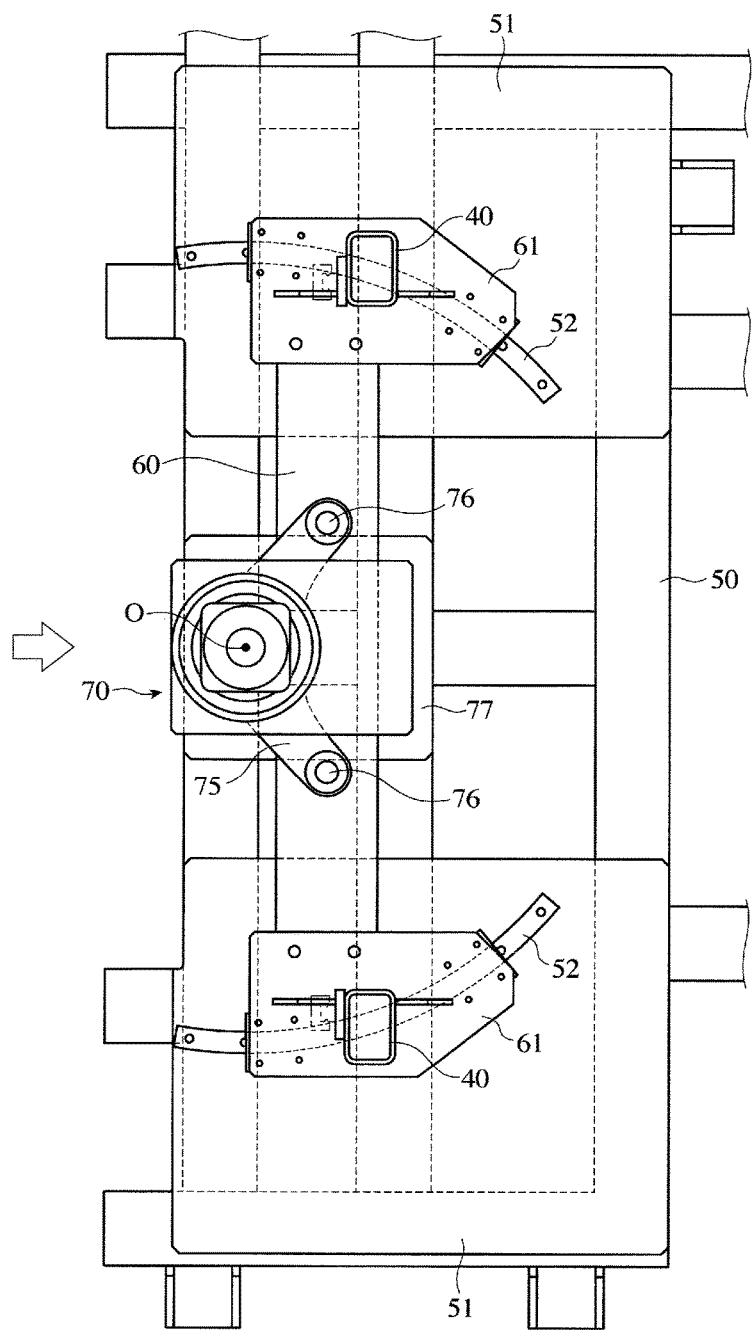
FIG. 5 is a partially omitted plan view showing the relation between circularly curved guide rails and a pair of laterally arranged movable frames.
Figure 6:
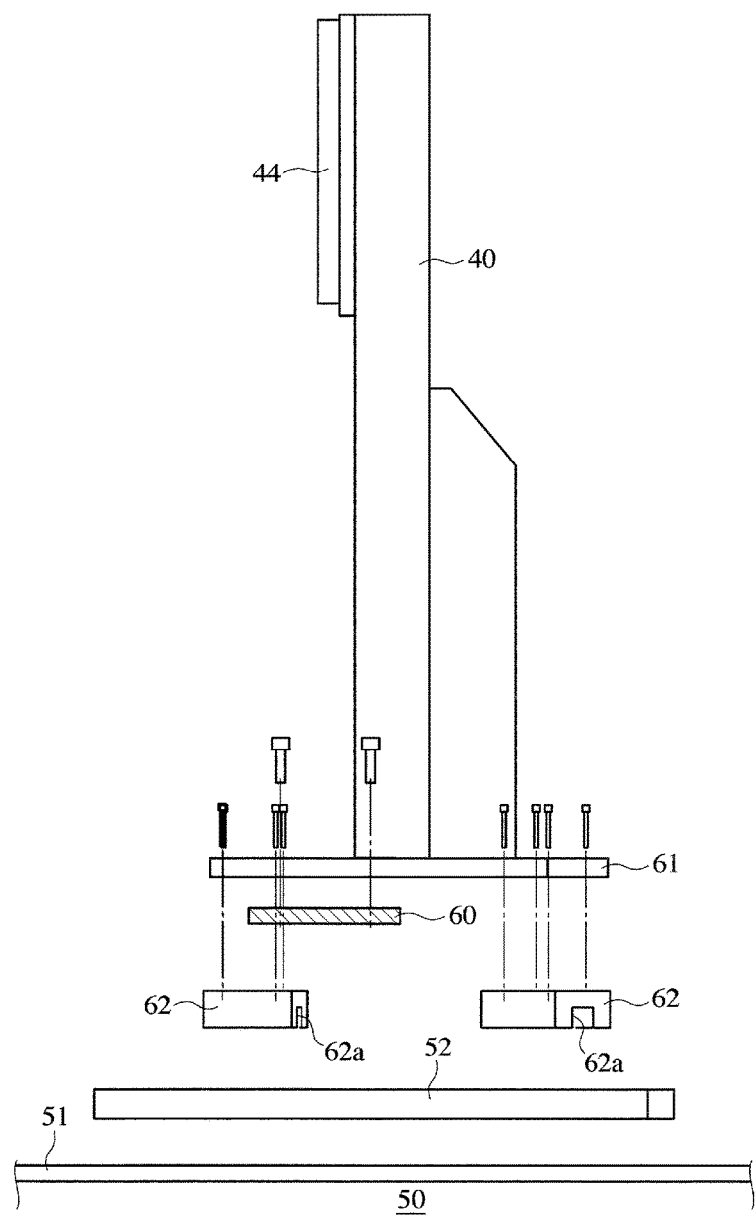
FIG. 6 is an exploded side view showing the structure of a movable frame movable along a circularly curved guide rail.

As is clear from FIGS. 2 and 5, each movable frame 40 fixed to an upper surface of each movable plate 61 is positioned under each stationary frame 30. As shown in FIG. 6, guide blocks 62 each having a guide groove 62a slidably engageable with the circularly curved guide rail 52 are fixed by bolts to a bottom surface of each movable plate 61. Both movable plates 61, 61 are fixed to both ends of the horizontal plate 60 by bolts.

The first driving means 70 connected to the horizontal plate 60 comprises a motor 71, a reduction gear 73 connected to a shaft 72 of the motor 71, a frame 74 supporting the reduction gear 73, and a connector plate 75 fixed to the shaft 72. The frame 74 is fixed to the flat plate 77 on the base 50. The connector plate 75 is fixed to the horizontal plate 60 by bolts 76.

Figure 7:
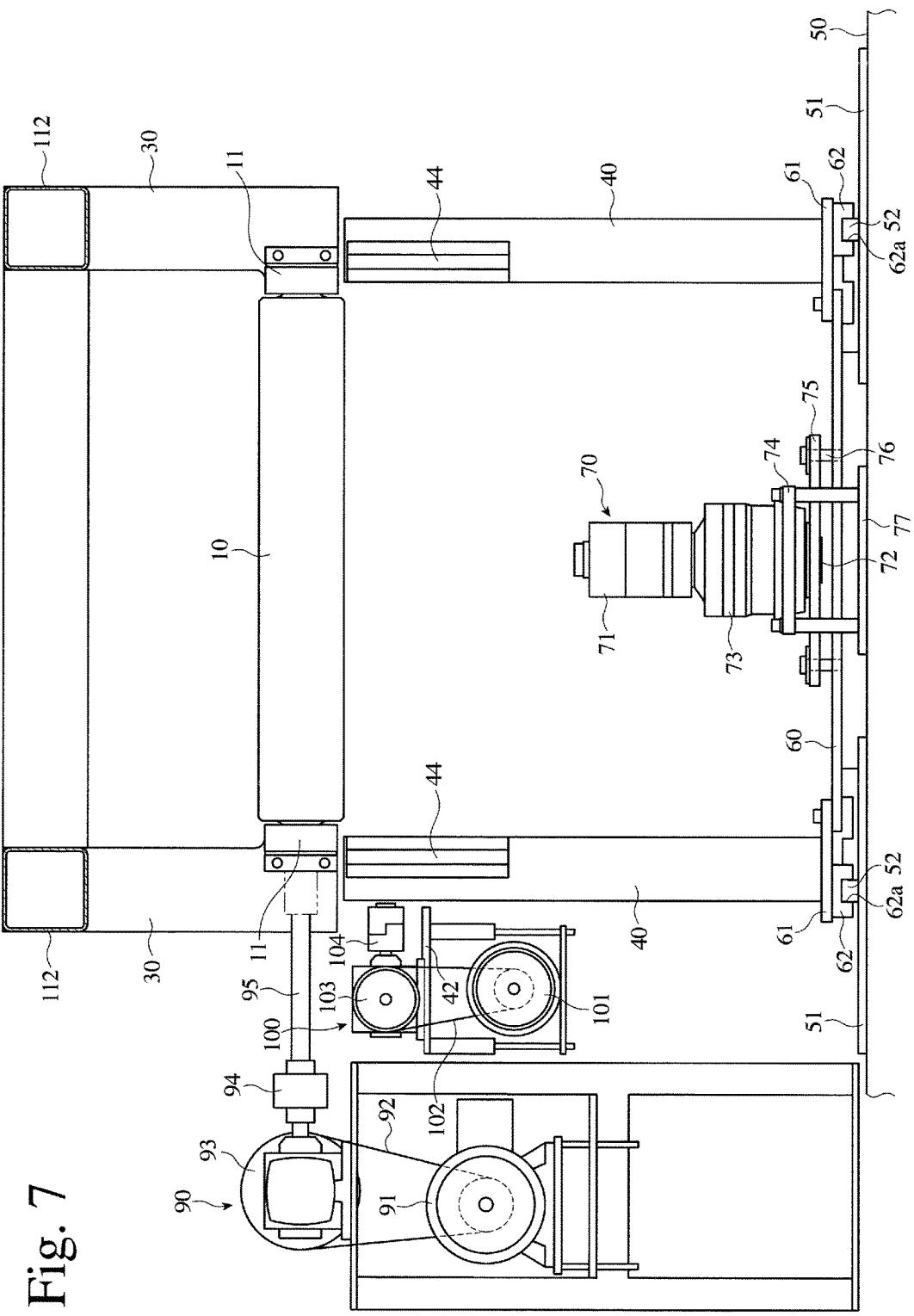
FIG. 7 is a front view showing the apparatus of FIG. 2, with a second roll and second driving means omitted.

Each second driving means 80 is fixed to a bracket 41 of each movable frame 40. Each second driving means 80 comprises a gear box 81 supported by the bracket 41 fixed to the movable frame 40, a motor 83 connected to the gear box 81 via a reduction gear 82, a screw jack 84 attached to the gear box 81, and a mail screw member 85 projecting from the screw jack 84. Each bearing 21 of the anvil roll 20 is supported by the mail screw member 85 of the screw jack 84 via a buffer 86. The buffer 86 comprises an elastic member such as a coil spring, and a load sensor, to prevent the bearing 21 of the anvil roll 20 from receiving excessive shock. As shown in FIGS. 3 and 7, a front surface of each movable frame 40 is provided with a vertical guide rail 44 engageable with a guide member 22 fixed to a rear surface of each bearing 21 of the anvil roll 20, so that the bearings 21 of the anvil roll 20 are movable up and down along the vertical guide rails 44 of the movable frames 40.

(3) Driving Means of Pattern Roll

As shown in FIG. 2, the third driving means 90 for rotating the pattern roll 10 comprises a motor 91, a reduction gear 93 connected to a rotation shaft of the motor 91 via a chain 92, and a coupling device 94 connected to a rotation shaft of the reduction gear 93, a shaft 95 extending from the coupling device 94 being connected to the bearing 11 of the pattern roll 10.

(4) Driving Means of Anvil Roll

As shown in FIG. 2, the fourth driving means 100 for rotating the anvil roll 20 is fixed to a bracket 42 fixed to one movable frame 40. The fourth driving means 100 comprises a motor 101, a reduction gear 103 connected to a rotation shaft of the motor 101 via a chain 102, and a coupling device 104 connected to a rotation shaft of the reduction gear 103, a shaft 105 extending from the coupling device 104 being connected to the bearing 21 of the anvil roll 20.

(5) Strain-Removing Roll

Figure 8A:
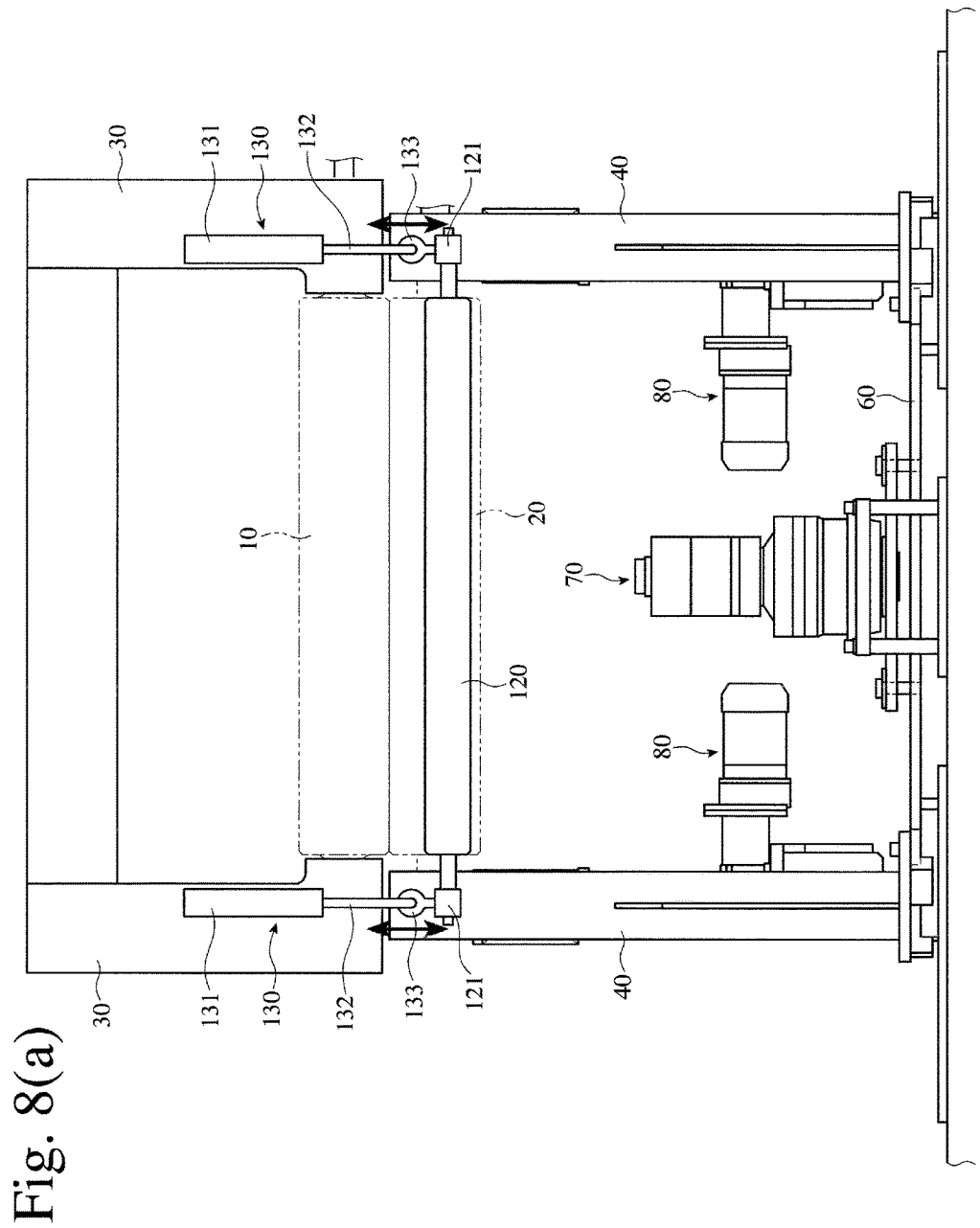
FIG. 8(a) is a rear view showing a strain-removing roll and fifth driving means mounted to the apparatus of the present invention.

Because strain is generated in a plastic film provided with large numbers of fine pores (microporous plastic film) Fa passing through a gap G between the pattern roll 10 and the anvil roll 20 relatively inclined to each other, troubles such as rupture, etc. may occur in the microporous plastic film Fa when wound up as it is. Accordingly, a strain-removing roll 120 is preferably disposed immediately downstream of the gap G between the pattern roll 10 and the anvil roll 20 as shown in FIG. 3. As shown in FIG. 8(a), bearings 121, 121 rotatably supporting both ends of the strain-removing roll 120 are moved up and down by the fifth driving means 130, 130 fixed to a pair of the stationary frames 30, 30 via brackets 31, 31. In the depicted example, each fifth driving means 130 comprises a cylinder (preferably an air or hydraulic cylinder) 131 supported by each bracket 31 fixed to each stationary frame 30, and a piston rod 132 slidably projecting from the cylinder 131, a tip end of the piston rod 132 being attached to the bearing 121 of the strain-removing roll 120 via a universal joint 133. Accordingly, as shown in FIG. 8(b), the heights of both ends of the strain-removing roll 120 can be changed by independently operating the fifth driving means 130, 130. Namely, the strain-removing roll 120 can be inclined at a desired angle δ relative to the horizon (parallel to the center axis of the pattern roll 10).

Because a guide roll 140 is positioned downstream of the strain-removing roll 120, the microporous plastic film Fa is subjected to laterally different tension by the inclined strain-removing roll 120 between the gap G between the pattern roll 10 and the anvil roll 20 and the guide roll 140, resulting in reduced strain. For example, when the anvil roll 20 is inclined such that a left side of the microporous plastic film Fa moves more forward than a right side, a left end of the strain-removing roll 120 is made higher than a right end by adjusting the strokes oft piston rods 132, 132 of a pair of the fifth driving means 130, 130, to sufficiently remove strain from the microporous plastic film Fa having fine pores formed by the pattern roll 10 and the anvil roll 20 relatively inclined to each other, resulting in less likelihood of troubles such as rupture, wrinkling, etc. during a winding step.

(6) Pattern Roll

Figure 9:
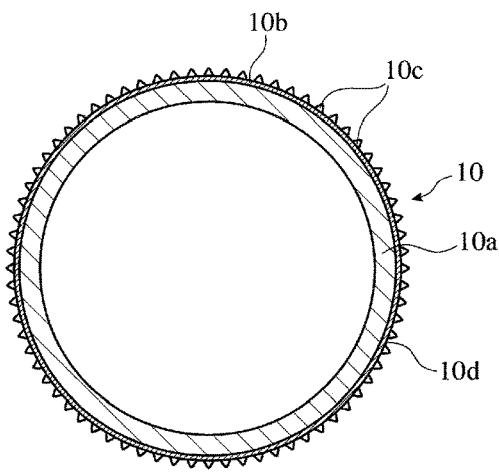
FIG. 9 is a cross-sectional view showing an example of pattern rolls.

As shown in FIG. 9, the pattern roll 10 preferably comprises large numbers of high-hardness, fine particles 10c randomly fixed to a rolling surface 10b of a metal roll body 10a by a plating layer 10d such as nickel plating, etc. Specific examples of such pattern roll 10 are described in, for example, JP 5-131557 A, JP 9-57860 A, and JP 2002-59487 A.

The high-hardness, fine particles 10c preferably have sharp edges (corners), and Mohs hardness of 5 or more. The high-hardness, fine particles 10c are preferably fine diamond particles, particularly pulverized fine diamond particles.

The high-hardness, fine particles 10c preferably have a particle size distribution in a range of 10-500 μm, depending on the depths and opening diameters of fine pores formed. When the particle sizes of the high-hardness, fine particles 10c are less than 10 μm, fine pores are not formed sufficiently in the plastic film F. On the other hand, when the particle sizes of the high-hardness, fine particles 10c are more than 500 μm, too large fine pores are formed in the plastic film F. The lower limit of the particle sizes of the high-hardness, fine particles 10c is more preferably 20 μm, most preferably 30 μm. The upper limit of the particle sizes of the high-hardness, fine particles 10c is more preferably 400 μm, most preferably 300 μm.

Because the high-hardness, fine particles 10c attached to a rolling surface of the pattern roll 10 have different particle size distributions, depending on (i) the material and thickness of the plastic film F used, (ii) the depths, opening diameters and density of fine pores Ranted, and (iii) whether or not recesses 20b are formed on a rolling surface of the anvil roll 20, the particle size distribution of the high-hardness, fine particles 10c is properly selected within the above range.

The high-hardness, fine particles 10c preferably have aspect ratios of 3 or less. With the aspect ratios of 3 or less, the high-hardness, fine particles 10c have polygonal shapes close to spheres. The aspect ratios of the high-hardness, fine particles 10c are more preferably 2 or less, most preferably 1.5 or less.

With about ½ to about ⅔ of the high-hardness, fine particles 10c embedded in the plating layer 10d, the height distribution of the high-hardness, fine particles 10c projecting from a surface of the plating layer 10d is preferably in a range of 10-400 μm. When the height of the high-hardness, fine particles 10c is less than 10 μm, sufficient fine pores are not formed. On the other hand, when the height of the high-hardness, fine particles 10c is more than 400 μm, too large fine pores are formed in the plastic film F. The lower limit of the height distribution of the high-hardness, fine particles 10c is more preferably 20 μm, most preferably 30 μm. The upper limit of the height distribution of the high-hardness, fine particles 10c is more preferably 300 μm, most preferably 200 μm.

The area ratio of the high-hardness, fine particles 10c on a rolling surface 10b of the pattern roll 10 (a surface percentage of the pattern roll 10 occupied by the high-hardness, fine particles 10c) is preferably 10-70%. When the area ratio of the high-hardness, fine particles 10c is less than 10%, fine pores cannot be formed at a sufficient density in the plastic film F. On the other hand, the fixing of the high-hardness, fine particles 10c to the rolling surface 10b of the pattern roll 10 at an area ratio of more than 70% is practically difficult. The area ratio of the high-hardness, fine particles 10c is more preferably 20% in lower limit, and 60% in upper limit.

To prevent the pattern roll 10 from being bent while perforating the plastic film F, a roll body 10a of the pattern roll 10 is preferably made of a hard metal. The hard metal may be die steel such as SKD11.

(7) Anvil Roll

In order that the anvil roll 20 to be combined with the pattern roll 10 enables the high-hardness, fine particles 10c of the pattern roll 10 to sufficiently intrude a plastic film F, while exhibiting sufficient deformation resistance to a perforating load, the anvil roll 20 is preferably made of a high-strength, hard metal, particularly a high-strength, corrosion-resistant stainless steel (SUS440C, SUS304, etc.). Also, the anvil roll 20 may have a two-layer structure comprising an inner layer of a hard metal such as die steel, and an outer layer of high-strength, corrosion-resistant stainless steel such as SUS304. The thickness of the outer layer may be practically about 20-60 mm.

(8) Combinations of Pattern Roll and Anvil Roll

Figure 10A:
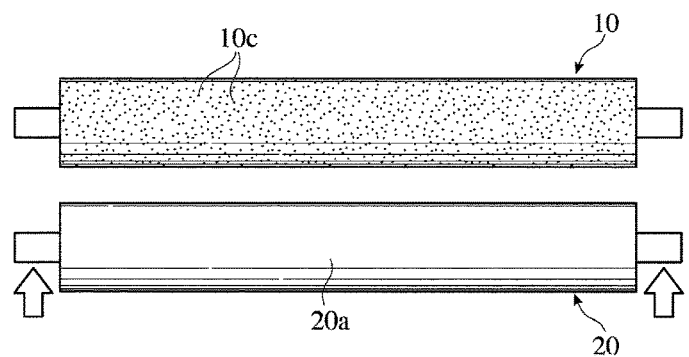
FIG. 10(a) is a front view showing a combination of a pattern roll and an anvil roll having a flat rolling surface.
Figure 10B:
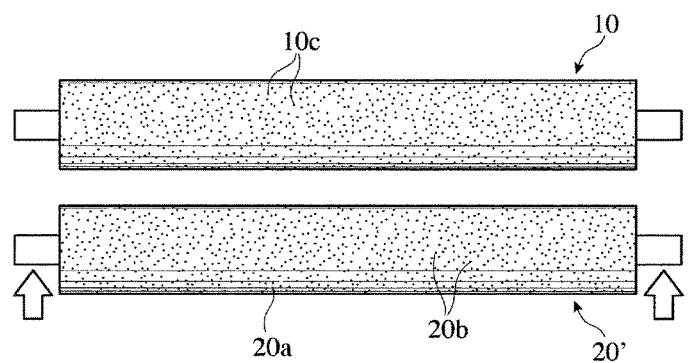
FIG. 10(b) is a front view showing a combination of a pattern roll and an anvil roll having recesses on a rolling surface.

The combinations of a pattern roll and an anvil roll include a combination of a pattern roll 10 and an anvil roll (first anvil roll) 201 having a flat rolling surface as shown in FIG. 10(a), and a combination of a pattern roll 10 and an anvil roll (second anvil roll) 202 having large numbers (pluralities) of recesses 20b on a rolling surface 20a as shown in FIG. 10(b).

(a) Combination of Pattern Roll and First Anvil Roll

Figure 11:
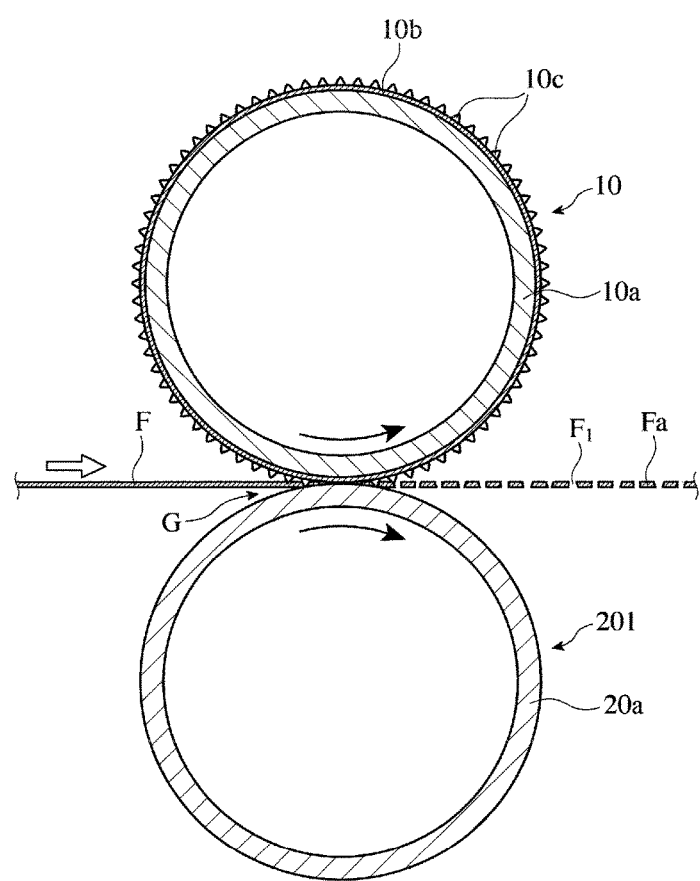
FIG. 11 is a cross-sectional view showing the formation of pores in a plastic film by a combination of a pattern roll and an anvil roll having a flat rolling surface.

When a pattern roll 10 having large numbers of high-hardness, fine particles 10c on a rolling surface 10a is combined with a first anvil roll 201 having a flat rolling surface 20a, as shown in FIG. 11, a plastic film F passing through a gap between the pattern roll 10 and the first anvil roll 201 is opened by the high-hardness, fine particles 10c, so that fine pores $F_1$ are formed in the plastic film F. Because the high-hardness, fine particles 10c cannot enter the rolling surface 20a of the first anvil roll 201 deeply, the resultant microporous plastic film Fa does not have so high an opening ratio as in the combination of the pattern roll 10 and the second anvil roll 202 having large numbers of recesses 20b on a rolling surface 20a.

(b) Combination of Pattern Roll and Second Anvil Roll

Figure 12:
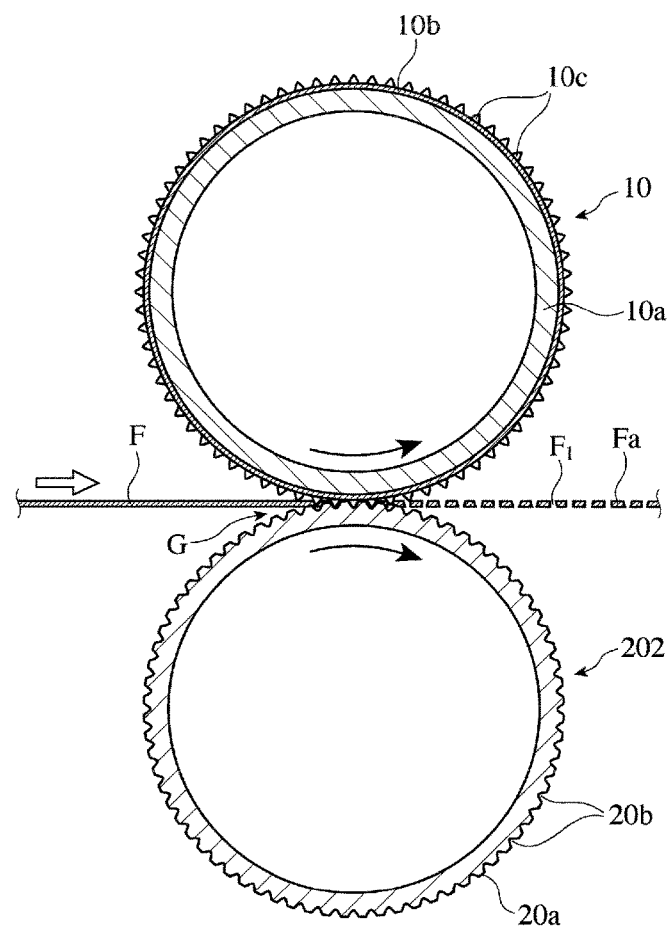
FIG. 12 is a cross-sectional view showing the formation of pores in a plastic film by a combination of a pattern roll and an anvil roll having recesses on a rolling surface.

When a pattern roll 10 having large numbers of high-hardness, fine particles 10c on a rolling surface 10a is combined with a second anvil roll 202 having large numbers of recesses 20b on a rolling surface 20a, as shown in FIG. 12, a plastic film F passing through a gap between the pattern roll 10 and the second anvil roll 202 is plastically deformed by the high-hardness, fine particles 10c, and engages the recesses 20b of the second anvil roll 202. In regions in which the high-hardness, fine particles 10c come into contact with the recesses 20b of the second anvil roll 202, fine pores $F_1$ are formed in the plastic film F.

As described below, the high-hardness, fine particles 10c of the pattern roll 10 are fit into the recesses 20b of the second anvil roll 202, the high-hardness, fine particles 10c should have as close sizes and shapes to those of the recesses 20b as possible. To this end, the particle size distribution width of the high-hardness, fine particles 10c is preferably as narrow as possible. The "particle size distribution width" is the difference between the maximum particle size and the minimum particle size. Of course, the opening diameter distribution width of the recesses 20b (difference between the maximum opening diameter and the minimum opening diameter) is also preferably as narrow as possible.

The recesses 20b of the second anvil roll 202 preferably have an opening diameter distribution in a range of 10-400 μm, and a depth distribution in a range of 10-400 μm. When the opening diameters and depths of the recesses 20b are less than 10 μm, sufficiently many fine pores $F_1$ cannot be formed in the plastic film F. On the other hand, when the opening diameters and depths of the recesses 20b are more than 400 μm, too large fine pores $F_1$ are formed in the plastic film F. The lower limit of the opening diameters and depths of the recesses 20b is more preferably 20 μm, most preferably 30 μm. The upper limit of the opening diameters and depths of the recesses 20b are more preferably 300 μm, most preferably 200 μm.

The area ratio of the recesses 20b on a rolling surface of the second anvil roll 202 (percentage of an anvil roll surface occupied by recesses 20b) is preferably 10-70%. When the area ratio of the recesses 20b is less than 10%, fine pores cannot be formed at a sufficient density in the plastic film F. On the other hand, the formation of recesses 20b on a rolling surface of the second anvil roll 202 at an area ratio of more than 70% is practically difficult. The area ratio of the recesses 20b is more preferably 20% in lower limit, and 60% in upper limit.

The particle size of each high-hardness, fine particle 10c on the pattern roll 10 is expressed by a diameter of a circle having the same area (equivalent circle diameter), and the opening diameter of each recess 20b on the second anvil roll 202 is expressed by a diameter of a circle having the same area (equivalent circle diameter).

More fine pores $F_1$ are formed in the plastic film F by the combination of the pattern roll 10 and the second anvil roll 202 than by the combination of the pattern roll 10 and the first anvil roll 201.

Figure 13:
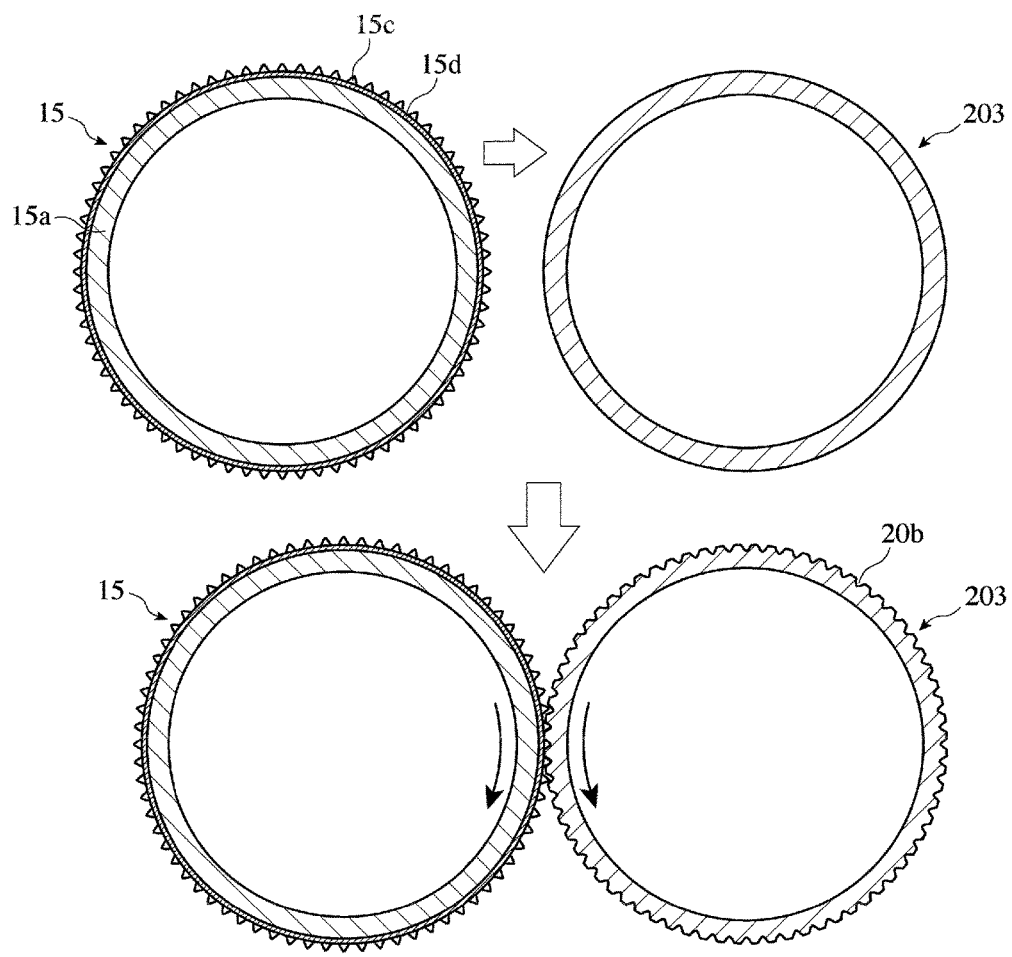
FIG. 13 is a schematic cross-sectional view showing the production of a second anvil roll by pushing a recess-forming pattern roll to a metal roll having a flat rolling surface.

As shown in FIG. 13, the second anvil roll 202 is produced by pressing a recess-forming pattern roll 15 having large numbers of high-hardness, fine particles 15c randomly attached to a rolling surface of a roll body 15a by a plating layer 15d, to a metal roll 203 having a flat rolling surface. Like the pattern roll 10, high-hardness, fine particles 15c on the recess-forming pattern roll 15 preferably have sharp edges, Mohs hardness of 5 or more, aspect ratios of 3 or less, a particle size distribution in a range of 10-500 μm, and a height distribution (from a surface of the plating layer 15d) in a range of 10-400 μm. The particle sizes of the high-hardness, fine particles 15c are more preferably 20-400 μm, most preferably 30-300 μm.

The aspect ratios of the high-hardness, fine particles 15c on the recess-forming pattern roll 15 are more preferably 2 or less, most preferably 1.5 or less. The area ratio of the high-hardness, fine particles 15c on the recess-forming pattern roll 15 is preferably 10-70%, more preferably 20-60%.

Because the recess-forming pattern roll 15 may have the same distribution of high-hardness, fine particles as that of the pattern roll 10 as described above, the pattern roll 10 may be used as a recess-forming pattern roll 15.

Because high-hardness, fine particles (for example, fine diamond particles) 15c are sufficiently harder than the metal roll 203, recesses 20b corresponding to the high-hardness, fine particles 15c are formed on a rolling surface of the metal roll 203 by pressing the recess-forming pattern roll 15 thereto. Burrs around recesses 20b formed on a rolling surface of the metal roll 203 are removed by grinding, etc. The metal roll 203 provided with recesses 20b acts as the second anvil roll 202.

(9) Sensor

A sensor 145 is preferably disposed downstream of the gap G between the pattern roll 10 and the anvil roll 20, to observe the characteristics (diameter distribution and opening ratio of fine pores, wrinkles, etc.) of a perforated plastic film Fa exiting from the gap G The apparatus of the present invention also comprises a controller (not shown), to which an output signal of the sensor 145 is input. According to the output signal of the sensor 145, the controller forms a signal for adjusting the gap between the pattern roll 10 and the anvil roll 20, a signal for adjusting the horizontal inclination angle θ of the center axis of the anvil roll 20 to the center axis of the pattern roll 10, and a signal for adjusting the vertical inclination angle δ of the strain-removing roll 120, to obtain a desired perforated plastic film Fa.

[2] Second Embodiment

Because the apparatus in the second embodiment has basically the same structure as that of the apparatus in the first embodiment except for a backup roll, the same reference numerals are assigned to common members, and explanation will be omitted except for the backup roll.

Figure 14:
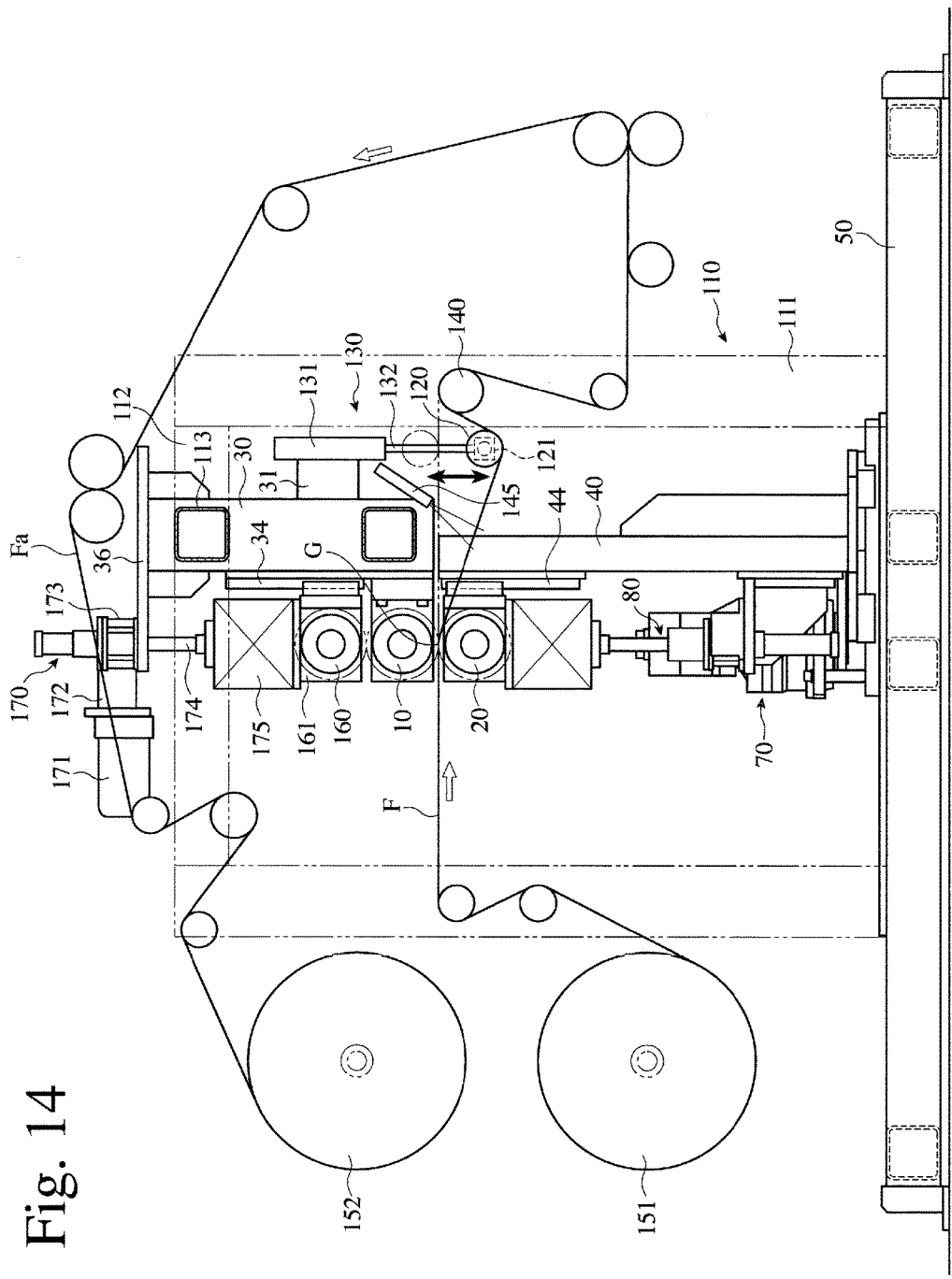
FIG. 14 is a side view showing an apparatus for producing a microporous plastic film according to the second embodiment of the present invention.

As shown in FIG. 14, the apparatus in the second embodiment comprises a backup roll 160 above the pattern roll 10, to reduce the bending of the pattern roll 10 when forming fine pores. The backup roll 160 coming into contact with the pattern roll 10 is preferably a roll having a relatively elastic rolling surface, such as a rubber roll, etc. The backup roll 160 is movable up and down along vertical guide rails 34, 34 of a pair of the stationary frames 30, 30 fixed to the second horizontal frame 113 extending between a pair of horizontal frames 112, 112.

Both bearings 161, 161 of the backup roll 160 are driven by a pair of sixth driving means 170, 170 fixed to the brackets 36, 36 of a pair of stationary frames 30, 30. Each sixth driving means 170 comprises a motor 171, a reduction gear 172 connected to the motor 171, a screw jack 173 mounted to a bracket 36 fixed to the stationary frame 30 and connected to the reduction gear 172, a mail screw member 174 projecting from the screw jack 173, and a buffer 175 mounted to a lower end of the mail screw member 174. The buffer 175 comprises an elastic member such as a coil spring, and a load sensor, to prevent excessive shock from being applied to the bearing 161 of the backup roll 160.

When the mail screw member 174 of the screw jack 173 is lowered by the operation of the motor 171 as shown in FIG. 14, the bearing 161 of the backup roll 160 is pushed downward via the buffer 175. As a result, the backup roll 160 pushes the pattern roll 10 downward to reduce the bending of the pattern roll 10 during forming pores. With the bending of the pattern roll 10 reduced, a relative inclination angle between the pattern roll 10 and the anvil roll 20 can be made smaller, thereby reducing strain generated in the microporous plastic film Fa.

[3] Production of Microporous Plastic Film[0093] (1) Plastic Film

A plastic film F, in which fine pores are formed by the pore-forming apparatus of the present invention, should have softness enabling the formation of fine pores by the high-hardness, fine particles 10c of the pattern roll 10, and such high strength and hardness as to avoid troubles such as rupture, wrinkling, etc. when passing through a gap G between the pattern roll 10 and the anvil roll 20 relatively inclined to each other. Such plastics are preferably flexible thermoplastic polymers, which include polyesters such as polyethylene terephthalate (PET), polybutylene terephthalate (PBT), etc.; polyolefins such as oriented polypropylene (OPP), etc.; polyamides such as nylons (Ny), etc.; polyvinyl chloride; polyvinylidene chloride; polystyrenes; etc.

The plastic film F for forming microporous films for wrapping breads, cookies, vegetables, fermented foods such as fermented soybeans and kimchi, etc. preferably has thickness in a range of 8-100 μm. When the thickness of the plastic film F is less than 8 μm, it does not have sufficient strength for a wrapping film. On the other hand, when the thickness of the plastic film F is more than 100 μm, it is too hard for a wrapping film. The thickness of the plastic film F is more preferably 10-80 μm, most preferably 12-60 μm.

The plastic film F may be a single-layer film or a laminate film. Particularly when heat sealing is conducted, the plastic film F is preferably a laminate film having a sealant layer of a low-melting-point resin such as LLDPE and EVAc as an inner layer. The sealant layer may be as thick as about 20-60 μm.

(2) Forming Pores in Plastic Film

In the first embodiment, when the anvil roll 20 at a downward position is in parallel with the pattern roll 10 (the horizontal inclination angle θ of the center axis of the anvil roll 20 to the center axis of the pattern roll 10 is 10°), a plastic film F is unwound from the first reel 151, passes through a large gap G between the pattern roll 10 and the anvil roll 20, the strain-removing roll 120, the guide roll 140, and pluralities of guide rolls and nip rolls, and is wound up by the second reel 152, while operating the third and fourth driving means 90, 100 to rotate the pattern roll 10 and the anvil roll 20.

When the second driving means 80, 80 are operated, the anvil roll 20 is moved upward, so that the plastic film F gradually comes into contact with the pattern roll 10 and the anvil roll 20 in the gap G, thereby being pressed by them.

Figure 15A:
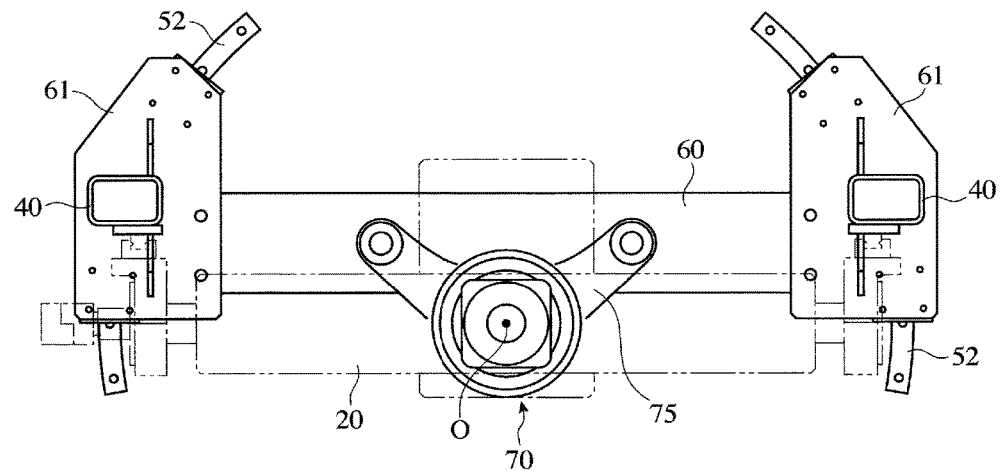
FIG. 15(a) is a plan view showing the relation between a pair of laterally arranged movable frames and a pair of circularly curved guide rails when a second roll is parallel with a first roll.
Figure 15B:
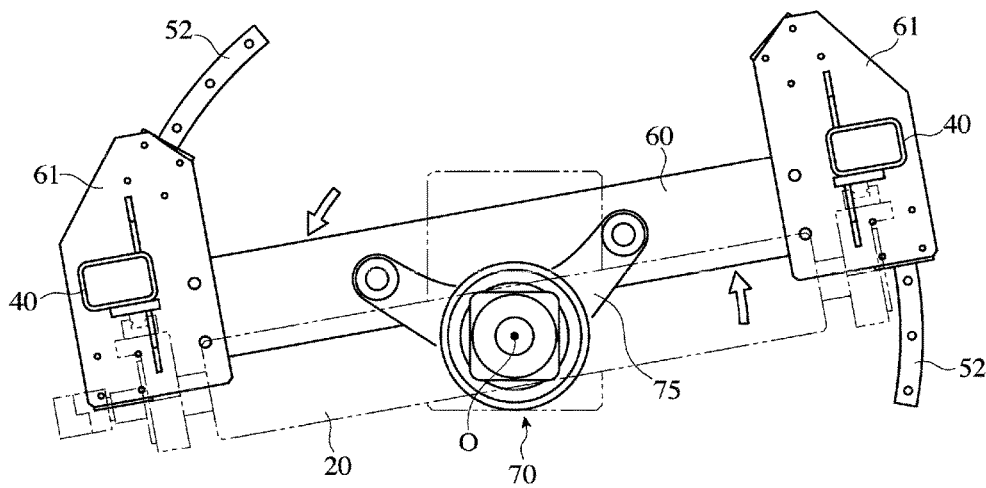
FIG. 15(b) is a plan view showing the relation between a pair of laterally arranged movable frames and a pair of circularly curved guide rails when a second roll is inclined counterclockwise to a first roll in a horizontal plane.
Figure 15C:
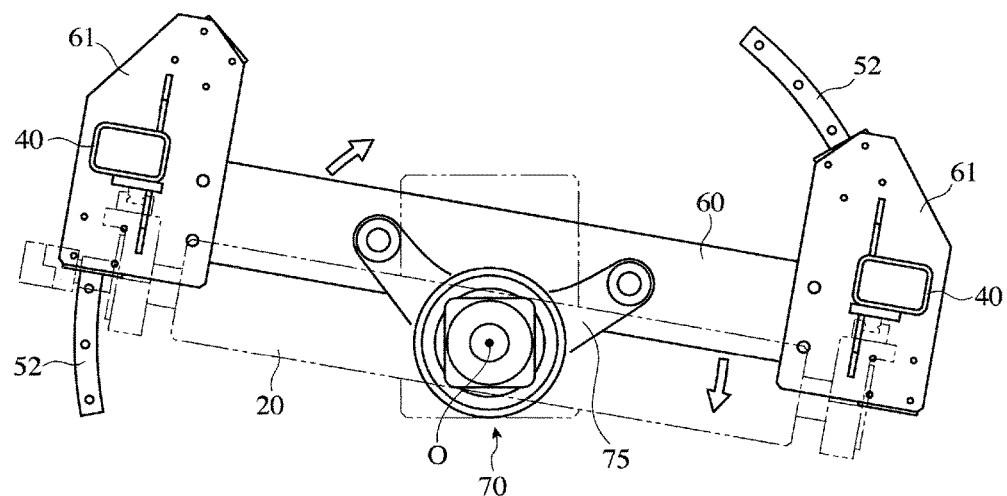
FIG. 15(c) is a plan view showing the relation between a pair of laterally arranged movable frames and a pair of circularly curved guide rails when a second roll is inclined clockwise to a first roll in a horizontal plane.
Figure 16:
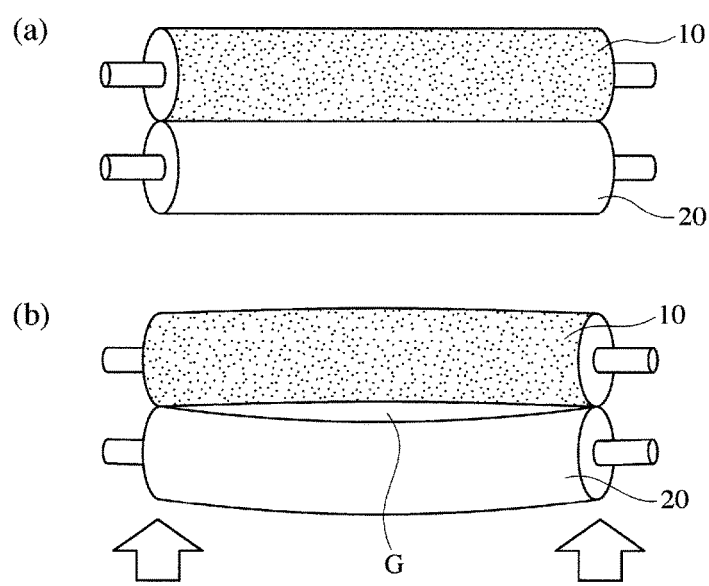
FIG. 16 is a schematic view exaggeratedly showing a pattern roll and an anvil roll arranged in parallel, which are bent during forming fine pores in a plastic film.

When the first driving means 70 is operated (rotated) around the center point O, a pair of movable plates 61, 61 connected to the horizontal plate 60 are laterally rotated along the circularly curved guide rails 52, 52, so that the anvil roll 20, whose bearings 21, 21 are fixed to the movable frames 40, 40, is inclined in a horizontal plane from a state parallel to the pattern roll 10 [FIG. 15(*a*)], counterclockwise [FIG. 15(*b*)], or clockwise [FIG. 15(*c*)]. When the anvil roll 20 is inclined by a desired angle θ clockwise or counterclockwise relative to the pattern roll 10 in a horizontal plane, stress applied to the plastic film 2 passing through the gap G between the pattern roll 10 and the anvil roll 20 is made laterally uniform.

The characteristics of the plastic film F (perforated plastic film Fa after perforation is started) exiting from the gap G are observed by the sensor 145, whose signal is output to a controller (not shown), which forms a first signal for adjusting (optimizing) the gap between the pattern roll 10 and the anvil roll 20, a second signal for adjusting (optimizing) the horizontal inclination angle θ of the center axis of the anvil roll 20 to the center axis of the pattern roll 10, and a third signal for adjusting (optimizing) the vertical inclination angle δ of the strain-removing roll 120, thereby obtaining a desired perforated plastic film Fa. In this state, the plastic film F is perforated to form a desired perforated plastic film Fa, which is finally wound around the second reel 152.

[4] Microporous Plastic Film

The microporous plastic film produced by the apparatus of the present invention can have moisture permeability of 100-7000 g/m²·24 hr at 40° C. and 90% RH, by adjusting a pressing force by the pattern roll 10 and the anvil roll 20, and their relative inclination angle θ. The moisture permeability is measured by "Testing Methods for Determination of Water Vapor Transmission Rate of Moisture-Proof Packaging Materials" of JIS Z 0208. When the moisture permeability is less than 100 g/m²·24 hr at 40° C. and 90% RH, the microporous plastic film does not have necessary moisture permeability for foods such as breads, vegetables, etc. On the other hand, when the moisture permeability is more than 7000 g/m²·24 hr at 40° C. and 90% RH, the microporous plastic film has too high moisture permeability. The moisture permeability of the microporous plastic film is preferably 200-6000 g/m²·24 hr at 40° C. and 90% RH, more preferably 300-6000 g/m²·24 hr at 40° C. and 90% RH. The moisture permeability of the microporous plastic film may be properly selected within the above range depending on contents to be wrapped.

Effects of the Invention

Because the apparatus of the present invention has a structure comprising the second roll (for example, anvil roll) movable up and down along the movable frame relative to the first roll (for example, pattern roll) rotatably supported by the stationary frame, and because the movable frame is rotated, the horizontal inclination angle of the center axis of the second roll to the center axis of the first roll can be properly set, depending on the opening diameters, depths, area density, etc. of fine pores formed in the plastic film, so that large numbers of fine pores can be formed transversely uniformly in the plastic film under the optimum conditions. Also, strain generated in a plastic film provided with large numbers of fine pores (perforated plastic film) by the inclination of the center axis of the second roll to the center axis of the first roll is absorbed by a strain-removing roll vertically inclined to the perforated plastic film at a position downstream of a gap between the first roll and the second roll, thereby preventing the rupture and wrinkling of the plastic film during perforation. A microporous plastic film produced by the apparatus of the present invention is suitable for films for wrapping foods such as breads, cookies, vegetables, fermented foods such as fermented soybeans and kimchi, etc., which require proper air permeability and moisture permeability.

DESCRIPTION OF REFERENCE NUMERALS

10: First roll (pattern roll)
10*a*, 15*a*: Roll body
10*b*, 15*b*: Rolling surface
10*c*, 15*c*: High-hardness, fine particle
10*d*, 15*d*: Plating layer
11: Bearing
15: Recess-forming pattern roll
20: Second roll (anvil roll)
201: First anvil roll
202: Second anvil roll
203: Metal roll
20*a*: Roll body
20*b*: Recess
21: Bearing
30: Stationary frame
31, 36: Bracket
34: Vertical guide rail
40: Movable frame
41, 42: Bracket
44: Vertical guide rail
50: Base
51: Flat plate
52: Circularly curved guide rail
60: Horizontal plate
61: Movable plate
62: Guide block
62*a*: Guide groove
70: First driving means
71: Motor
72: Shaft of motor
73: Reduction gear
74: Frame
75: Connector plate
76: Bolt 77: Flat plate
80: Second driving means
81: Gear box
82: Reduction gear
83: Motor
84: Screw jack
85: Mail screw member
86: Buffer
90: Third driving means
91: Motor
92: Chain
93: Reduction gear
94: Coupling device
95: Shaft
100: Fourth driving means
101: Motor
102: Chain
103: Reduction gear
104: Coupling device
105: Shaft
110: Frame structure
111: Vertical frame
112: Horizontal frame
113: Second horizontal frame
120: Strain-removing roll
121: Bearing of strain-removing roll
130: Fifth driving means
131: Cylinder
132: Piston rod
133: Universal joint
140: Guide roll
145: Sensor
151: Reel around which plastic film is wound
152: Reel around which perforated plastic film is to be wound
160: Backup roll
161: Bearing
170: Sixth driving means
171: Motor
172: Reduction gear
173: Screw jack
174: Mail screw member
175: Buffer
F: Plastic film
Fa: Microporous plastic film
$F_1$: Fine pore
G: Gap between first and second rolls
θ: Horizontal inclination angle of center axis of second roll to center axis of first roll
δ: Vertical inclination angle of strain-removing roll

What is claimed is:

1. An apparatus for producing a microporous plastic film comprising
a first roll rotatably supported by a pair of laterally arranged stationary frames;
a second roll movable up and down along a pair of laterally arranged movable frames, such that said second roll comes into contact with said first roll via a plastic film;
rolls for passing said plastic film through a gap between said first roll and said second roll;
a first motor for rotating HA the pair of said movable frames;
second motor each mounted to each of said movable frames to move said second roll up and down;
a third motor for rotating said first roll; and
a fourth motor for rotating said second roll;
one of said first and second rolls being a pattern roll randomly having pluralities of high-hardness, fine particles on its rolling surface, and the other being an anvil roll; and
in a state where the center axis of said second roll is inclined to the center axis of said first roll in a horizontal plane by the operation of said first motor, said plastic film passing through a gap between said first roll and said second roll, so that said high-hardness, fine particles form pluralities of fine pores in said plastic film.

2. The apparatus for producing a microporous plastic film according to claim 1, wherein the pair of said movable frames are rotated by said first motor along a pair of laterally arranged horizontal circularly curved guide rails.

3. The apparatus for producing a microporous plastic film according to claim 1, wherein
movable plates, to which said movable frames are fixed, are fixed to both ends of a horizontal plate connected to said first motor; and
each of said circularly curved guide rails engages a guide groove on a bottom surface of each of said movable plates.

4. The apparatus for producing a microporous plastic film according to claim 1, wherein
a strain-removing roll coming into contact with a plastic film provided with pluralities of fine pores (perforated plastic film), and a pair of fifth motor for changing the heights of bearings rotatably supporting both ends of said strain-removing roll are arranged downstream of a gap between said first roll and said second roll; and
at least one end of said strain-removing rolls is moved up or down by operating at least one of said fifth motor, thereby vertically inclining said strain-removing roll to the perforated plastic film, to absorb strain generated in said perforated plastic film due to the inclination of the center axis of said second roll to the center axis of said first roll.

5. The apparatus for producing a microporous plastic film according to claim 4, further comprising
a sensor disposed downstream of a gap between said first roll and said second roll for observing the characteristics of the resultant perforated plastic film; and
a controller receiving an output signal of said sensor for forming a signal for adjusting a gap between said first roll and said second roll, a signal for adjusting the horizontal inclination angle of the center axis of said second roll to the center axis of said first roll, and a signal for adjusting the vertical inclination angle of said strain-removing roll, to obtain a desired perforated plastic film.

6. The apparatus for producing a microporous plastic film according to claim 5, wherein the perforation of said plastic film is started, in a state where the horizontal inclination angle of the center axis of said second roll to the center axis of said first roll is 0°, and where the vertical inclination angle of said strain-removing roll is 0°; and said first and second motors and said fifth motor are then operated according to signals output from said sensor.

7. The apparatus for producing a microporous plastic film according to claim 1, wherein said first roll is a pattern roll, and said second roll is an anvil roll.

8. The apparatus for producing a microporous plastic film according to claim 1, wherein said high-hardness, fine particles of said pattern roll have sharp edges and Mohs hardness of 5 or more.

9. The apparatus for producing a microporous plastic film according to claim 1, wherein the area ratio of said high-hardness, fine particles on a rolling surface of said pattern roll is 10-70%.

10. The apparatus for producing a microporous plastic film according to claim 1, wherein said anvil roll is a metal roll having a flat rolling surface, or a metal roll randomly having pluralities of recesses having an opening diameter distribution and a depth distribution adapted to the high-hardness, fine particles of said pattern roll.

11. The apparatus for producing a microporous plastic film according to claim 10, wherein said anvil roll is a metal roll randomly having pluralities of recesses having an opening diameter distribution and a depth distribution adapted to the high-hardness, fine particles of said pattern roll; the area ratio of said recesses on a rolling surface of said anvil roll being 10-70%.

* * * * *